Nov. 2, 1926.

S. MANHEIM 1,605,674

AUTOMOBILE CLOCK

Filed May 5, 1923

INVENTOR
Salomon Manheim
BY
Wooster & Davis
ATTORNEYS

Nov. 2, 1926.

S. MANHEIM 1,605,674

AUTOMOBILE CLOCK

Filed May 5, 1923      3 Sheets-Sheet 2

INVENTOR
Salomon Manheim
BY
Wooster & Davis
ATTORNEYS

Nov. 2, 1926.  
S. MANHEIM  
AUTOMOBILE CLOCK  
Filed May 5, 1923  
1,605,674  
3 Sheets-Sheet 3

INVENTOR  
Salomon Manheim  
BY  
Wooster & Davis  
ATTORNEYS

Patented Nov. 2, 1926.

1,605,674

UNITED STATES PATENT OFFICE.

SALOMON MANHEIM, OF BRIDGEPORT, CONNECTICUT.

AUTOMOBILE CLOCK.

Application filed May 5, 1923. Serial No. 636,802.

This invention relates to a clock which is particularly adapted for use on vehicles, although it is not, of course, confined to such use but is equally adapted for stationary use, the same as any other clock.

It is an object of the invention to provide a clock which may be attached to the instrument board of a motor car, aeroplane, ship, or the like and which will be automatically wound by any suitable source of electric current.

It is also an object of the invention to provide a clock which will be self starting, that is, it will be automatically wound and will start of itself whenever it is connected in a circuit with any suitable source of electricity after it has run down. For example should it be used on a vehicle where the source of electricity is a storage battery, if this battery should be removed for repair or recharging, the clock would run under the action of the spring for a given length of time, but if the battery is not replaced and if the clock is not placed in circuit therewith before the spring has run down, the clock will stop with the elements in such a position that as soon as the clock is connected in circuit with the battery it will be immediately wound and will start automatically.

It is a further object of the invention to provide improved mountings for the various elements of the clock whereby there can be no short circuiting of current from the motor through the timing mechanism.

It is a still further object of the invention to provide an improved construction whereby should the control mechanism for the motor fail the spring for operating the timing mechanism cannot be wound too tightly or injured, and it is a still further object of the invention to provide an automatically wound clock in which the spring is always wound to exactly the same tension at each winding operation and exactly the amount which it has run down, so that the driving effect of the spring is always substantially uniform, whereby a very accurate clock may be provided.

With the foregoing and other objects in view I have devised the construction illustrated in the accompanying drawings, in which—

In the embodiment illustrated I have mounted the clock in a casing adapted to be secured to the instrument board of an automobile or the like, but it may, of course, be mounted in any suitable casing desired for any of the usual uses of a clock, the showing being merely illustrative of one specific use of this mechanism. Although I have illustrated the electrical spring winding mechanism as applied to a clock, it will be obvious that it may be used for winding the spring of any spring operated mechanism, such for example as a phonograph motor.

Figure 2:
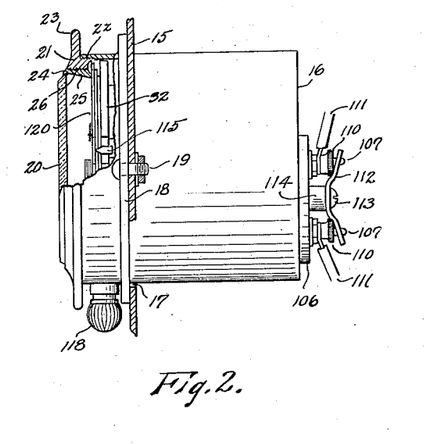
Fig. 2 is a side elevation thereof showing a construction of a clock casing which is adapted for attachment to the instrument board of an automobile, flying machine or the like, with a portion at the front broken away to more clearly show the construction.
Figure 3:
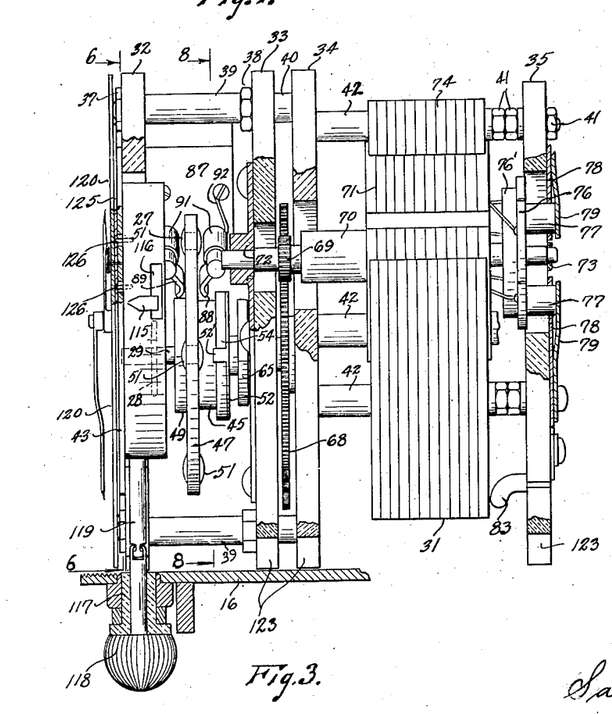
Fig. 3 is a side elevation of the clock mechanism with the casing removed, certain portions being broken away to more clearly show the construction.
Figure 4:
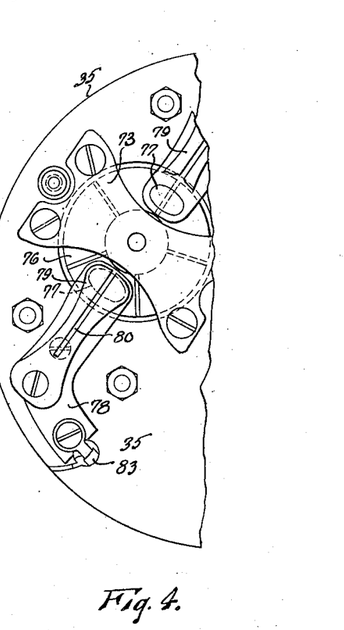
Fig. 4 is a rear view looking from the right of Fig. 3, showing a method of mounting the brushes for the motor.

Referring to Fig. 2 I have shown at 15 a section of the instrument board and at 16 a casing in which the mechanism is mounted which extends through an opening 17 in the board and has an external flange 18 adapted to rest against the front surface of the board, and through which suitable securing bolts 19 may be passed for securing the casing to the board. This casing is preferably made of brass or other non-magnetic material though of course it may be made of any material that is found suitable. It is open at its forward end for the insertion of the clock mechanism and is then closed by a suitable ring carrying the crystal 20. This ring is indicated at 21 externally threaded for engaging internal threads on the front end of the casing, as shown at 22, the flange 23 of the ring being preferably knurled on its edge to facilitate rotation thereof for applying and removing the ring from the casing. The crystal 20 is sprung or forced into position behind flange 24 on a small ring 25 threaded within the ring 21, as shown at 26. The casing is dust proof as the only entrance thereto is at the forward end which is closed by a screw threaded front. The clock mechanism is a complete assembly which is inserted and removed as such through the open forward end of the casing after the screw threaded front has been removed.

The clock comprises a timing mechanism of which I have merely shown the enclosing casing 27 as this mechanism is a standard non-magnetic movement including the balance wheel, trains of gearing and so forth, but in which the usual main spring has been omitted. I have, however, indicated the main spring driving wheel in dotted lines at 28, which drives the train of gearing in the movement. In the present instance this gear is mounted on a shaft 29 which projects from the back of the casing 27 and is driven by a suitable convolute spring 30. As will presently be described, this spring is automatically wound at predetermined intervals by an electric motor, indicated at 31, through suitable mechanism which will also presently be described. The motor, the winding mechanism, the automatic control and the timing mechanism or watch movement are all mounted on insulating discs, in the present embodiment there being four of these insulating discs 32, 33, 34 and 35, preferably made of a suitable fibre and forming four pillar plates which are secured together in proper spaced relation by suitable pillars. The first three plates 32, 33 and 34 are secured together by suitable pillars 36 extending through the plates. Each is threaded into the plate 34 and provided with a nut 37 on the front side of plate 32 and a nut 38 on the front side of plate 33. The plates 32 and 33 are secured in proper spaced relation by spacing tubes 39 and plates 33 and 34 by an enlargement 40 on the pillars. Plates 34 and 35 are held in proper spaced relation by suitable shouldered pillars 42 and nuts 41 threaded thereon. These latter pillars also support the field magnets for the winding motor.

The timing mechanism or watch movement 27 is preferably mounted on the forward pillar plate 32 by means of a plate 43 to which the timing mechanism is secured, the mechanism being preferably in an opening 44 in the plate 32. The shaft 29 for the main driving wheel 28 has secured to it a barrel 45, preferably by threading the barrel thereto, and this barrel encloses the spring 30. This barrel has on its forward side a shoulder 46 upon which is mounted an insulatintg contact disc 47, preferably made of fibre. The barrel also has a second and smaller shoulder 48 upon which is mounted a gathering ratchet 49 secured to the barrel by suitable screws 50. The gathering ratchet retains the contact disc 47 on its shoulder, but this disc is free to rotate on its shoulder between the ratchet and the barrel. The contact disc 47 has one or more metal contacts 51 which preferably extend through the disc and project somewhat from the opposite surfaces thereof so as to properly contact with other contacts in a manner presently to be described.

The barrel 45 is open on the opposite side from the contact disc for insertion and removal of the driving spring 30, but after the spring is inserted in the barrel it is retained therein by an annular disc 52 secured over the open side of the barrel by suitable screws 53 threaded into the flange 54 of this barrel. The disc 52 is also provided with fingers 52′ adapted to embrace the flange 54. The inner wall of the barrel is formed in its periphery with one or more notches 55, preferably four, which are adapted to receive a lip 56 on a slipping piece 57. This piece is preferably a curved resilient metal strip placed between the spring and the barrel and to which at the opposite end from the lip 56 the outer end of the spring is secured, as shown at 58, the inner end of the spring being connected to an arbor 59 secured to a winding shaft 60, preferably by threading it to this shaft. There is thus provided a flexible or floating connection between the barrel and spindle 60 which will allow relative movement of the barrel with respect to the spindle so that the axis of the barrel does not necessarily need to be in alignment with the axis of the spindle. This shaft is mounted to rotate in suitable bearings on plates 61 and 62 carried by the pillar plates 33 and 34 respectively, and has a flange 63 to properly position the shaft. Between the bearing plate 61 and the arbor 59 the shaft is provided with a square portion 64 on which is mounted a winding ratchet 65 so that this ratchet will rotate with the shaft. Mounted upon a squared portion 60' of this shaft between the bearing plates so as to rotate therewith is an insulating support 66 having a flange 67 to which the large winding gear 68 is secured, the support 66 acting to insulate this wheel or gear from the shaft 60. Meshing with the wheel or gear 68 is a pinion 69 mounted on the shaft 70 of the motor armature 71, an outboard bearing 72 being provided for this shaft on the pillar plate 33, and it has a bearing at its opposite end in the plate 73 on the pillar plate 35. A collet 63' retains element 66 against flange 63.

The armature may be of any suitable type mounted to rotate between the opposite poles of a laminated field magnet 74. The armature coils are connected to insulated blocks of the commutator 76 upon which bear a pair of brushes 77. These brushes preferably bear against the ends of these blocks and in a direction longitudinally of the axis of the commutator, the commutator being really a flat disc mounted on an insulating support 76'. The brushes 77 are guided in suitable supports 78 and are preferably eliptical in cross section so as to prevent turning. This shape also gives a better bearing on the commutator. They are pressed against the commutator by suitable flat springs 79. These springs are preferably split longitudinally from their free ends, as shown at 80 to render them more flexible and uniform in action.

Figures 5, 10, 11, 12, 13, 14:
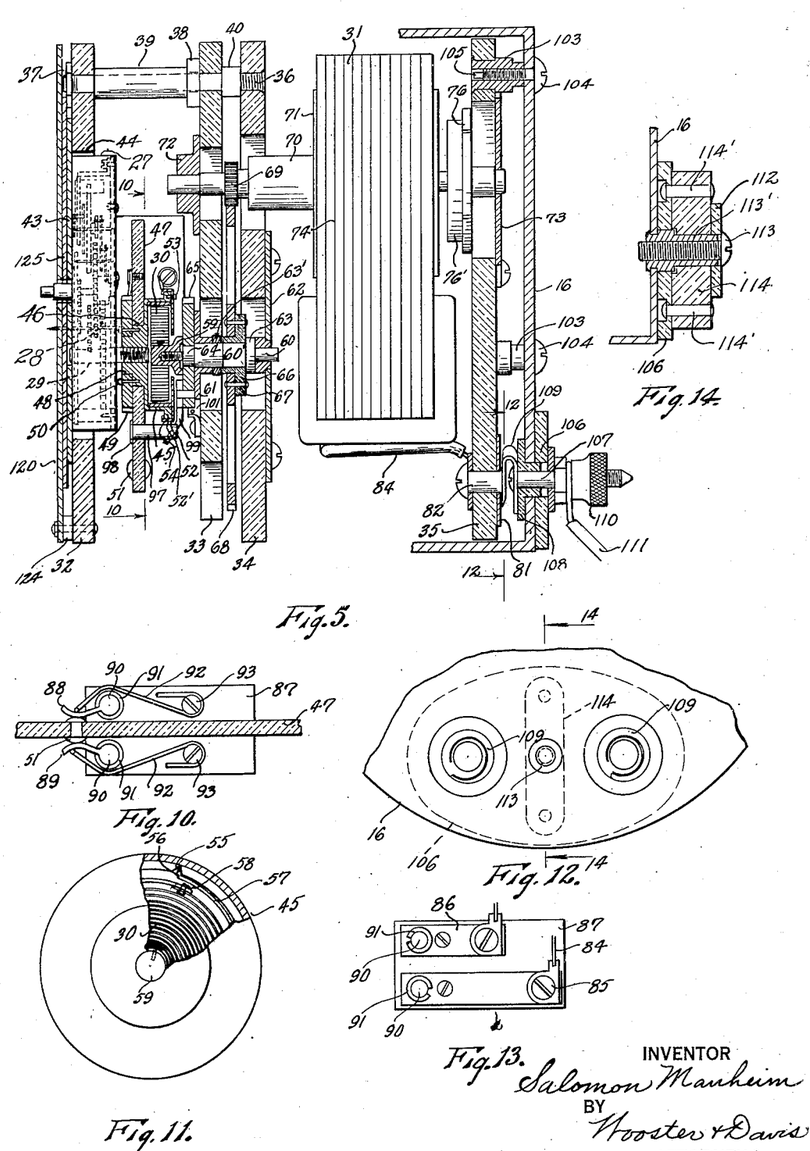
Fig. 5 is a longitudinal section through the mechanism substantially on line 5—5 of Fig. 8.
Fig. 10 is a detailed sectional view of the automatic circuit closing device taken substantially on line 10—10 of Fig. 7.
Fig. 11 is a plan view of the spring barrel with a portion of the end wall broken away to show the means for preventing the spring becoming too tightly wound.
Fig. 12 is a detailed view substantially on line 12—12 of Fig. 5.
Fig. 13 is a detail view of the back of the contact carrying block shown in Fig. 10 and from the other side of this block.
Fig. 14 is a section substantially on line 14—14 of Fig. 12.
Figure 6:
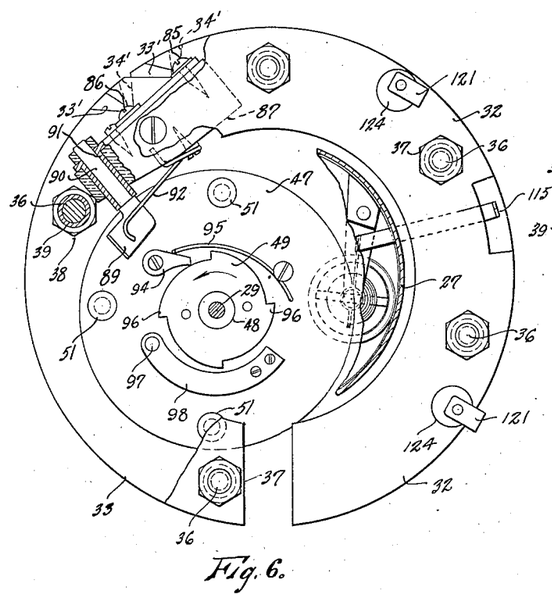
Fig. 6 is a transverse section substantially on line 6—6 of Fig. 3, showing the position of the contact disc and the gathering ratchet immediately after a winding operation has been completed.
Figure 8:
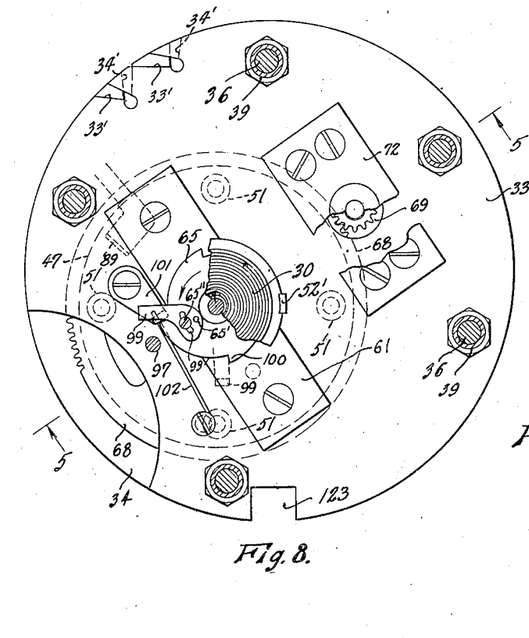
Fig. 8 is a transverse section substantially on line 8—8 of Fig. 3, showing certain elements of the winding mechanism at the completion of a winding operation and corresponding to Fig. 6.
Figure 9:
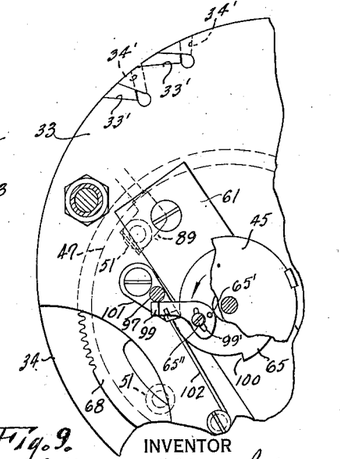
Fig. 9 is a view showing certain of the elements of Fig. 8 but in the positions they occupy when the clock has run down and stopped with a source of electric current removed.

On the back of pillar plate 35 are two contact discs 81 secured to the plate by suitable screw studs 82, from one of which a lead wire 83 leads to one of the supporting plates 78 for one of the brushes 77, and from the other of which a lead 84 extends to one of a pair of contacts 85 and 86 carried on an insulating block 87. The lead wires to and from the contacts 85 and 86 pass through notches 33' and 34' in the peripheries of fibre pillar plates 33 and 34 respectively, and these notches are inclined in opposite directions as shown in Figs. 6, 8 and 9 so as to retain the lead wires therein and prevent their accidental displacement. They also keep these wires from contact with the casing 16 so that should the insulation become worn there will be no short circuit established through the casing. Carried by this block are a pair of pivoted contact blades 88 and 89 mounted on studs 90 mounted to turn in suitable bearings 91 in the block 87. The blades 88 and 89 are preferably curved, as shown in Fig. 10, and are normally pressed against the opposite sides of the insulating contact disc 47 by springs 92 secured to the block 87 by any suitable means, as screws 93, and the contact blades 88, 89 are so located as to be engaged by the contacts 51 when they pass between the same as the disc 47 is rotated in a manner presently to be described. Carried by the disc 47 is a click or pawl 94 normally held in engagement with the gathering ratchet 49 by a suitable spring 95, the gathering ratchet being provided with one or more teeth 96, the number of teeth depending on the number of winding operations which are to take place during one revolution of the contact disc. Also carried by the contact disc 47 is a retractible stop pin 97 carried by a flat spring 98. This pin 97 extends through the disc and projects from the inner side thereof, as shown in Fig. 5, but is slidable in the disc so that if desired it may be moved out of the path of a second stop 99 carried by the winding ratchet 65 although this stop or pin 97 is normally held in extended position by the spring 98. The winding ratchet 65 is provided with one or more teeth 100 depending on the number of winding operations to be performed in one rotation of the contact disc, and mounted on the pillar plate 33 is a pawl or click 101 normally held in engagement with the periphery of the winding ratchet by a spring 102. The stop 99 is secured to the ratchet 65 in such a way that it may be adjusted in setting up to determine its proper position and make sure the clock stops with the electrical contacts in circuit closing position. For this purpose a pin 65' is provided about which the stop may turn. It is secured in the proper position by screw 65'' in a curved slot 99' in the stop.

The clock mechanism may be mounted in a casing 16 by any suitable means, but I preferably provide a plurality of posts 103 in the rear pillar plate 35 and projecting rearwardly therefrom, these posts being internally threaded to receive securing screws 104 passing through openings in the rear wall of the casing 16. To facilitate insertion of these screws they are preferably provided at their ends with reduced guiding portions 105.

For the purpose of forming electrical connection for driving the motor from an external source of current I mount in the back wall of the casing two insulating bushings 108 extending through this back wall and having flanges engaging the inner surface thereof. Through this bushing extends a metal stud 107. The studs extend through an insulating washer or plate 106 on the outside of the casing, and each stud carries a helical spring contact 109, preferably made of flat metal, adapted to contact with the contact plates 81 carried by the pillar plate 35. These studs 107 form suitable binding posts having nuts 110 for securing the lead wires 111 thereto. To prevent accidental loosening of these nuts 110 by the vibration incident to use of the vehicle, I preferably secure a fibre plate 112 outside these nuts by means of a screw 113 threaded into a metal tube 113' riveted into the rear wall of casing 16 and extending through an elongated fibre post 114, the plate 112 having openings into which the ends of the studs 107 extend. The post 114 is secured to plate 106 by rivets 114' and it also acts as a separating means to keep the lead wires 111 from coming in contact and forming a short circuit should they become loosened from the binding posts.

Figure 7:
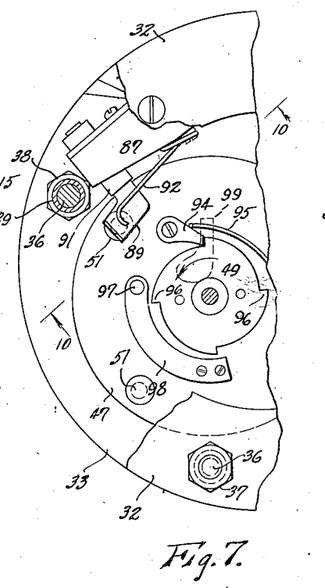
Fig. 7 is a similar view with a portion of the elements disclosed in Fig. 6 showing them in the positions they occupy at the beginning of a winding operation.

The operation is as follows:

Assuming that the spring 30 has been wound and the circuit broken through the motor the parts are in substantially the position shown in Figs. 6 and 8. As the timing mechanism or watch runs, shafts 29 will be rotated by the spring 30 as this is the medium by which the spring operates the watch movement. As this shaft rotates it rotates in the direction indicated by the arrow in Fig. 6 and carries with it gathering ratchet 49. As this ratchet rotates a tooth 96 thereof engages the pawl or click 94 carried by the contact disc 47 and thus causes this disc to rotate with the shaft. As this disc is rotated sooner or later a contact 51 carried by the disc is carried into engagement with the two contact blades 88, 89 as shown in Fig. 7, and closes the circuit through the motor. Movement of the disc 47 has carried stop 97 some distance in advance of stop 99 carried by the winding ratchet 65 as shown in Fig. 7, and as contact 51 engages the blade 88, 89 the circuit is closed through the motor causing the armature to rotate and drive the pinion and gears 69, 68 respectively, to wind the spring 30. Rotation of the large gear 68 and the winding shaft 60 will rotate the winding ratchet 65 and with it the stop 99, and as this stop advances it engages the rear side of stop 97 and through this stop advances contact disc 47 to remove the contact 51 from between the blades 88, 89 and thus break the circuit through the motor which of course then stops. The momentum of the rotating parts is such, however, that it does not stop immediately but runs along enough to carry the disc 47 to substantially a position shown in Fig. 6 and to carry one of the teeth 100 on the winding ratchet 65 beyond the pawl or click 101. As the motor stops, the armature and shaft 60 are moved backwardly under the action of spring 30 until a tooth 100 comes in contact with the pawl 101 when the motor will come to rest. As the spring 30 is a comparatively light one the motor should not offer too great a resistance to this backward movement. For the purpose of reducing this resistance the brushes 77 are located against the end of the commutator as above described. This recoil action also has the advantage of overcoming the banking error of the watch escapement due to the rapid winding as it relieves somewhat the spring tension at the completion of the winding operation. Rotation of contact disc 47 except under the action of the gathering ratchet 49 and stops 97 and 99 is prevented by the frictional engagement of contacts 88 and 89 on the opposite sides thereof under action of springs 92. Rotation of the disc 47 between these contacts also keeps their surfaces clean so they always make good electrical contact with the contacts 51. The elements now are in substantially the position shown in Figs. 6 and 8 with the spring wound. As the watch movement runs and the spring runs down the next contact 51 is brought into engagement with the blades 88, 89 when the winding operation is repeated. It will thus be apparent that the spring is always wound to the same extent and to exactly the same amount it has run down so that the tension of the spring on the timing mechanism is always substantially constant. In the embodiment shown there are four contacts 51 carried by the disc 47 so that there are four winding operations for one revolution of the disc 47, and the shaft 29 and the large winding wheel 68 is rotated a quarter revolution for each winding operation. These arrangements may of course be varied as desired, the device being operative with one contact 51 only carried by the disc 47, but a plurality of these contacts are preferred as by more frequent winding there is not so great a variation in the tension of the spring 30, and under certain conditions as will presently be described the timing mechanism will not stop as quickly should the source of current to the motor be disconnected.

With the use of a standard movement for the timing mechanism the large wheel 28 and shaft 29 make one revolution in six and one half hours, and therefore, the contact disc 47 will make one revolution in six and one half hours. With four contacts 51 carried by this disc the spring 30 will thus be wound once in every one hour, thirty seven and one half minutes. The spring has, however, sufficient energy to run the timing mechanism for over six and one half hours or for a complete revolution of shaft 29 and disc 47. Thus should the connection to the source of electric current be disconnected the clock will not stop when the next contact 51 is brought into engagement with the blades 88, 89 even though as the power is disconnected there will be no winding operation, but the clock will continue running until the disc 47 has made a complete revolution and the stop 97 is carried around and engages the rear side of the stop 99, as shown in Fig. 9. When this stop engages stop 99 it will be clear the spring is working against itself and the timing mechanism will stop running. The teeth 100 on the winding ratchet 65, the pawl 101, stops 99 and 97, and the contacts 51 are so located that when they reach the position shown in Fig. 9 and the clock stops, a contact 51 will be in engagement with the blades 88, 89. Thus it will be seen that as soon as the connection to the source of current is restored the circuit through the motor will be closed. The spring 30 will be immediately wound and the clock will start automatically. Thus the clock is self starting.

This feature is especially valuable in its use on motor vehicles where the source of current is a storage battery. Should the battery be removed for repair or recharging the clock will run at least four hours, fifty two and one half minutes before it will stop thus leaving this amount of time in which the battery may be removed and replaced without stopping the clock. If one contact 51 only was carried by the disc 47 it will be clear the spring would be wound only once for a complete revolution of disc 47, or that is, once in every six and a half hours, and thus with this arrangement should the source of current be disconnected only a short time before the winding operation should take place, say for example ten minutes, then the clock would only run ten minutes before it would stop.

Should for any reason the motor control fail and it should not stop at the end of a winding operation, and the spring 30 is, therefore, wound beyond a certain point, the lip 56 of the slipping piece 57 would be withdrawn from the notch 55, and the slipping piece will slide around inside the barrel until lip 56 engages another notch 55 allowing the spring to partly unwind. Therefore, with this arrangement the spring cannot be wound too tightly and will not be broken by too tight winding. The slipping piece may be made of different strengths to regulate the maximum extent to which the spring may be wound and unwound. In this mechanism the spring is not fully wound as it is in ordinary watch use where the watch is to run for over twenty four hours. In this case six and one half hours is the maximum length of run without winding, and therefore, it is not necessary to wind the spring to its maximum.

The timing mechanism is preferably provided with means for regulating it and this should be where it is accessible. For this purpose I extend the regulating lever 115 so that it will project through an opening 116 in the casing 27. There should also be provided means for setting the clock without too much trouble, and for this purpose I have mounted an insulating bushing 117 in one side of the casing and passed through this a setting stem 118 connecting with a setting rod 119 in a suitable and well known manner, and operating the usual watch setting movement. By pulling outwardly on the stem 118 and then rotating it, the hands may be set, and then the setting mechanism be made ineffective by pushing the stem inwardly, as is common practice in watch movements. This setting mechanism may, of course, be omitted and the hands set by other means as desired, as by setting them by hand. As the end of this setting stem projects into the casing the pillow plates 33, 34 and 35 are provided with notches 123 so that this stem will not interfere with insertion and removal of the mechanism into and from the casing.

Figure 1:
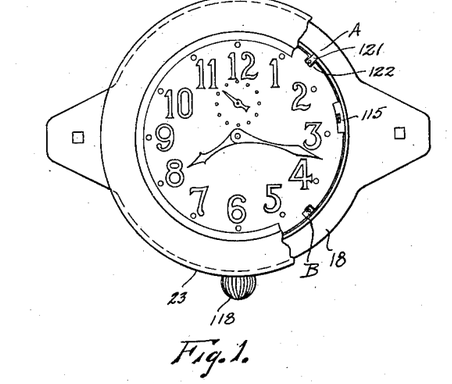
Fig. 1 is a front elevation of the face of the clock with a portion of the ring for holding the crystal broken away to illustrate the method of securing the dial in position.

I have also shown improved means for mounting the dial 120, and for this purpose have provided on plate 32 pivoted securing elements 121 mounted on fibre discs 124 and provided the dial with notches 122 in its periphery to receive these securing elements when they are turned into the position shown at A in Fig. 1. After the dial is in place it is secured in position by turning the free ends of the elements 121 laterally to the position shown at B in Fig. 1. The dial itself is secured to a plate 125 carrying two pins 126 adapted to enter holes carried by the watch movement to properly position the dial and prevent its movement from this position.

The timing mechanism or watch movement should preferably be non-magnetic because of the proximity to the electrically operated motor. The casing 16 should also preferably be non-magnetic. However, by mounting the various elements on spaced fibre pillar plates 32, 33, 34 and 35 as described above and by mounting the main winding wheel 68 on the insulating support 66 the motor is entirely insulated from the winding and control mechanism and also from the watch movement, so that there is little chance of this movement becoming magnetized or of a short circuit being established through the same.

From the foregoing description it will be clear the clock is entirely automatic, that it is wound automatically as long as it is connected with a suitable source of electric current, and also that it is self starting, so that should it be disconnected from this source of current a sufficient time for the clock to stop it will be automatically started as soon as it is again connected in a suitable source of power. Further, as the spring is wound in small increments and always to the same tension, its driving effect on the timing mechanism is substantially uniform, giving a very accurate timing mechanism. It will also be apparent that the winding mechanism is very simple and reliable and not apt to be easily gotten out of order in operation. Further that it is equally adapted for winding the spring of any spring operated mechanism, such for example as phonograph motors. I have, therefore, used the term timing mechanism in the claims in a generic sense to mean not only a watch or clock movement but any mechanism which is operated by a spring for a given time as the spring looses energy stored in it. This construction and arrangement of device allows the use of a power winding mechanism for small timing movements such as watch movements.

Having thus set forth the nature of my invention, what I claim is:

1. In combination, a timing mechanism, means for operating the timing mechanism, electrically controlled means for storing energy in said operating means, a rotatable disc controlled by the timing mechanism and movable independently thereof, a plurality of spaced insulated contacts carried by said disc adapted to close the circuit through said electrically controlled means, and a pawl and ratchet operated by the electrically controlled means for advancing said disc to open the circuit at the completion of an energy storing operation, said ratchet having the same number of teeth as there are contacts on the disc.

2. In combination, a timing mechanism, means for operating the timing mechanism, electrically controlled means for storing energy in said operating means, means for intermittently closing the circuit through said electrically controlled means and controlled by said timing mechanism, means controlled by the electrically controlled means for opening the circuit at the completion of an energy storing operation, and positively acting means for stopping the timing mechanism arranged to stop said mechanism at a predetermined time with the circuit closed should the energy in the timing mechanism operating means become exhausted.

3. In combination, a timing mechanism, means for operating the timing mechanism, electrically controlled means for storing energy in said operating means, a rotatable disc controlled by the timing mechanism and movable independently thereof, means carried by said disc adapted to close the circuit through said electrically controlled means, a stop carried by said disc, a second stop operated by the electrically controlled means adapted to engage the first stop and advance the disc to open the circuit at the completion of an energy storing operation, said second stop being so located with respect to the circuit closing means that on a complete revolution of the disc it will be engaged by the first stop and stop the timing mechanism with the circuit closed.

4. In combination, a timing mechanism, a spring for operating said timing mechanism, an insulating disc, means operated by the spring for rotating said disc and arranged to allow movement of the disc independently thereof, an electric motor for winding said spring, means carried by said disc adapted to control the operation of said motor, a stop carried by said disc, a second stop normally to the rear of the first stop and adapted to be operated by said motor to engage the first stop to advance the disc at the completion of a winding operation and stop the motor, said stops being so located that on a complete rotation of the disc without operation of the motor the first stop will engage the rear of the second and stop the timing mechanism with the motor circuit closed.

5. In combination, a timing mechanism, means for operating the timing mechanism, an electrically controlled means for storing energy in said operating means, an insulating disc operated by said first mentioned means, a contact carried by said disc to control said electrically controlled means, said contact being exposed on opposite sides of the disc, and yieldable contacts on opposite sides of the disc adapted to engage said contact on the disc.

6. In combination, a timing mechanism, means for operating the timing mechanism, an electric motor for storing energy in said means, means controlled by the timing mechanism for controlling said motor, spaced insulating supports upon which said means and mechanisms are mounted, and an insulated driving connection between the motor and the means for operating the timing mechanism.

7. In combination, a timing mechanism, a spring for operating the timing mechanism, power means for winding the spring, means controlled by the timing mechanism for controlling said power means, a movable element operated by the power means, a stop adjustably carried by said element arranged to place the time controlled means in an ineffective position at the end of a winding operation, and means for securing said stop in adjusted positions.

8. In combination, a timing mechanism, a spring for operating said timing mechanism, an electric motor for winding said spring, an insulating disc, a plurality of contacts carried by said disc arranged to close the circuit through said motor, a ratchet rotated by said spring, a pawl carried by said disc arranged to engage a tooth of the ratchet to rotate the disc, a driving connection between the motor and spring, and a second pawl and ratchet to prevent backward movement of the spring.

9. In combination, a timing mechanism, means for operating the timing mechanism, power means for storing energy in said operating means, a rotatable ratchet controlled by the timing mechanism, a rotatable disc movable independently of the ratchet, a pawl carried by the disc arranged to engage the ratchet to operate the disc, means carried by the disc for controlling the power means, and means operated by the power means for advancing said disc to stop the power means at the completion of an energy storing operation.

10. In combination, a timing mechanism, a convolute spring, a spindle connected to one end of said spring, an electric motor having driving connection with said spindle, a barrel connected to the other end of the spring and having driving connection with the timing mechanism, a rotatable ratchet operated by said barrel, an insulating disc movable independently of the ratchet, a pawl carried by the disc arranged to engage the ratchet for rotating the disc, means carried by the disc for closing the circuit through the motor, a stop carried by the disc, and a stop operated by the motor arranged to engage said first mentioned stop to advance the disc and open said circuit at the close of a winding operation.

11. In combination, a timing mechanism, a spring for operating said timing mechanism, a spindle connected with said spring, a winding wheel, a non-electrically conductive support for said wheel mounted on said spindle, an electrical power means having driving connection with said wheel, and means controlled by the timing mechanism for controlling said power means.

12. In combination, a timing mechanism, a spring for operating said timing mechanism, a rotatable disc controlled by said timing mechanism, power means for winding said spring, means carried by said disc for controlling the power means, a movable stop operated by the power means, and a stop carried by the disc normally in the path of movement of the power operated stop and so mounted that it may be moved out of said path of movement.

13. In combination, a timing mechanism, a spring for operating said timing mechanism, a rotatable support controlled by said timing mechanism, power means for winding said spring, means carried by said support for controlling the power means, a movable stop operated by the power means, a stop carried by said support movable to and from the path of movement of the first mentioned stop, and yieldable means tending to move said stop into the path of movement of the power operated stop.

14. In combination, a timing mechanism, a spring for operating the timing mechanism, power means for winding the spring, a rotatable support, an insulated contact carried by the support, contacts adapted to coact with the movable contact to control the power means, a ratchet rotated by the spring, a pawl carried by said support arranged to engage a tooth of the ratchet to rotate the support, a movable ratchet operated by the power means, a pawl adapted to coact with said ratchet to prevent backward movement of the spring, a stop adjustably carried by said ratchet arranged to place said movable contact in an ineffective position at the end of a winding operation and means for securing said stop in adjusted positions.

15. In combination, a timing mechanism, a spring for operating said timing mechanism, a rotatable element controlled by said timing mechanism, power means for winding said spring, means carried by said element for controlling the power means, a movable stop operated by the power means, and a stop carried by said element normally in the path of movement of the power operated stop, one of said stops being so mounted that it may be moved so as not to be engaged by the other stop.

16. In combination, a timing mechanism, a ratchet connected therewith, a spring for driving the timing mechanism, a power means for winding the spring, means for controlling the power means operated by said ratchet, a ratchet connected to the power means and arranged to prevent backward movement of the spring, and means controlled by the latter ratchet for controlling the power control means.

17. In combination, a timing mechanism, means for operating the timing mechanism, power means for storing energy in said operating means, pawl and ratchet operated means controlled by the timing mechanism for controlling said power means, and means controlled by the power means for rendering the time controlled means ineffective after a determined amount of energy has been stored in said means for operating the timing mechanism.

18. In combination, a timing mechanism, means for operating the timing mechanism, electrically controlled means for storing energy in said operating means, pawl and ratchet operated means carrying a contact for closing the circuit through said electrically controlled means and controlled by said timing mechanism, and ratchet operated means controlled by the electrically controlled means for breaking the circuit at the completion of an energy storing operation.

19. In combination, a timing mechanism, means for operating the timing mechanism, power means for storing energy in said operating means, means controlled by the timing mechanism for controlling said power means, and ratchet means controlled by the power means for rendering the time controlled means ineffective after a determined amount of energy has been stored in said means for operating the timing mechanism.

20. In combination, a timing mechanism, a spring for operating the timing mechanism, an electric motor for winding the spring, means controlled by the timing mechanism for controlling the motor, a ratchet operated by the motor, and an adjustably mounted means controlled by the motor for controlling the time controlled means.

21. In combination, a casing, a timing mechanism enclosed in said casing, a convolute spring mounted exterior of the casing, individual mountings for the spring and casing, the mounting for the spring including a rotary element connected to the spring and the timing mechanism, a power means for winding the spring, means exterior of the casing controlled by the rotary element for controlling the power means, and means controlled by the power means for stopping the power means at the completion of a winding operation.

22. In combination, a casing, a timing mechanism enclosed in said casing, a spring mounted exterior of the casing, individual mountings for the casing and the opposite ends of the spring, a power means to wind the spring, driving means connecting the mounting for one end of the spring to the timing mechanism, means connecting the mounting for the other end of the spring to the power means, and means exterior of the casing and controlled by the spring for controlling the power means.

In testimony whereof I affix my signature.

SALOMON MANHEIM.